United States Patent
Züfle

(10) Patent No.: US 7,066,725 B2
(45) Date of Patent: Jun. 27, 2006

(54) INJECTION MOLDING MACHINE WITH CONTROL SYSTEM

(75) Inventor: Michael Züfle, Wiedenzhausen (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 325 days.

(21) Appl. No.: 10/351,804

(22) Filed: Jan. 27, 2003

(65) Prior Publication Data

US 2003/0147984 A1  Aug. 7, 2003

(30) Foreign Application Priority Data

Feb. 7, 2002  (DE) .......................... 102 05 016

(51) Int. Cl.
*B29C 45/76*  (2006.01)

(52) U.S. Cl. .................... 425/135; 700/197; 700/316
(58) Field of Classification Search ................ 425/135; 700/197, 316
See application file for complete search history.

(56) References Cited

U.S. PATENT DOCUMENTS

| | | | |
|---|---|---|---|
| 4,759,705 A | 7/1988 | Otake et al. | |
| 5,513,115 A | 4/1996 | Richards et al. | |
| 5,518,671 A | 5/1996 | Takizawa et al. | |
| 5,811,134 A | 9/1998 | Takizawa | |
| 5,815,681 A | * | 9/1998 | Kikinis ........................ 710/316 |
| 6,311,101 B1 | * | 10/2001 | Kastner ....................... 700/197 |
| 2002/0031567 A1 | 3/2002 | Magario | |

FOREIGN PATENT DOCUMENTS

| | | |
|---|---|---|
| DE | 42 19 259 | 12/1993 |
| DE | 44 09 823 | 1/1995 |
| DE | 43 38 598 | 5/1995 |
| DE | 44 29 304 | 6/1995 |
| DE | 198 34 797 | 2/2000 |
| DE | 199 29 821 | 3/2000 |
| DE | 19847908 | 4/2000 |
| DE | 10041049 | 1/2002 |
| EP | 0 273 979 | 7/1988 |
| EP | 0 917 034 | 5/1999 |
| EP | 0 924 046 | 6/1999 |
| EP | 0 990 966 | 4/2000 |
| EP | 1 085 389 | 3/2001 |
| EP | 1 128 244 | 8/2001 |
| EP | 0 916 466 B1 | 10/2001 |
| GB | 2 341 946 | 3/2000 |
| JP | 2001162662 | 6/2001 |
| WO | WO 01 44883 | 6/2001 |

* cited by examiner

*Primary Examiner*—Tim Heitbrink
(74) *Attorney, Agent, or Firm*—Henry M. Feiereisen

(57) ABSTRACT

An injection molding machine includes a plurality of input and output units, a plurality of actuators, a plurality of sensors, and at least one computing unit, wherein a functional assignment of the input and output units, actuators and sensors is established via the computing unit and changeable online. As a result, it can be freely ascertained which input unit communicates with which output unit, in the presence of a plurality of input and output units, and changes in the configuration can easily be taken into account.

7 Claims, 2 Drawing Sheets

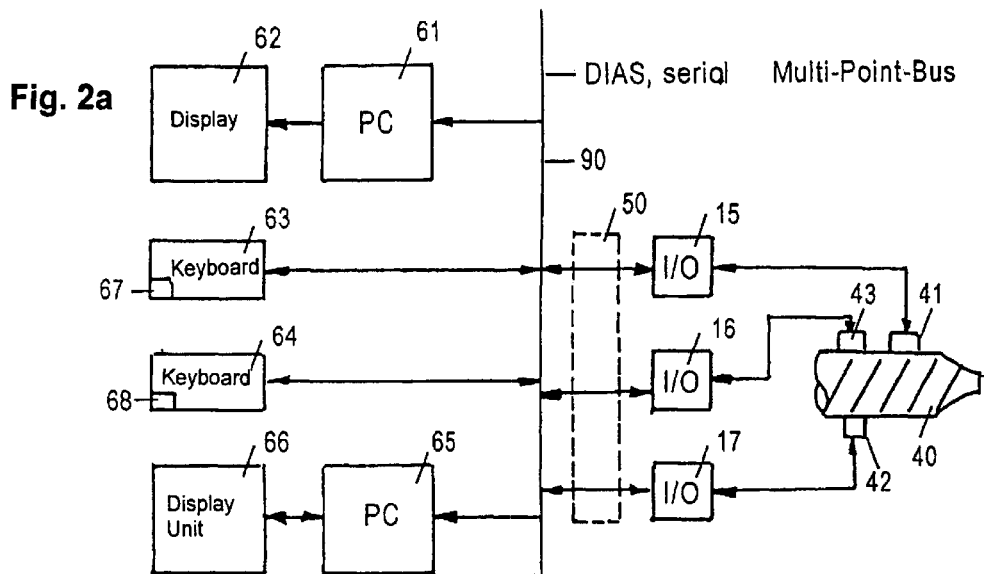
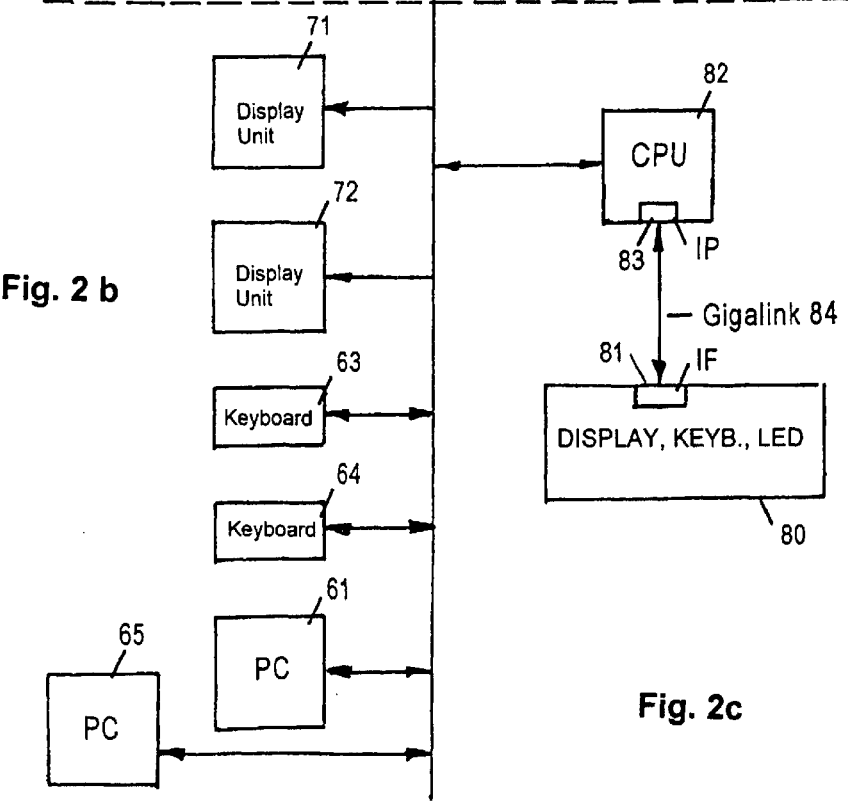

INJECTION MOLDING MACHINE WITH CONTROL SYSTEM

CROSS-REFERENCES TO RELATED APPLICATIONS

This application claims the priority of German Patent Application, Ser. No. 102 05 016.3, filed Feb. 7, 2002, pursuant to 35 U.S.C. 119(a)–(d), the disclosure of which is incorporated herein by reference.

BACKGROUND OF THE INVENTION

The present invention relates, in general, to an injection molding machine with a control system, and more particular to an injection molding machine with a control system including a bus system.

To ensure clarity, it is necessary to establish the definition of several important terms and abbreviations that will be used throughout this disclosure. The terms "computer" and "computing unit" are used interchangeably and include central processing units (CPU), microprocessors, customer-specific computers as well as commercially available personal computers (PC), work stations and the like. CAN is short for controller area network. LAN is short for local area network.

European Pat. No. EP 0 916 466 A1 describes an injection molding machine with a control system, shown in detail in FIG. 1. The control system includes an operating unit 1 and a machine control 10 for control of an injection molding machine 40 which is shown here schematically as screw-type injection molding machine. The operating unit 1 includes a display device 3, a keyboard 4, a memory 6, a microprocessor 2 and a printer 7, whereby these components of the operating unit 1 communicate with one another via a serial CAN bus 8. Data for controlling the injection molding machine 40 can be inputted via these components and visualized by the display device 3. Furthermore, there can be provided a mass storage or the like, and programs may be installed for controlling the injection molding machine 40.

The operating unit 1 further includes an interface 5 which, on one hand, is in communication with the serial bus 8 and, on the other hand, serves as adapter for a network system 20 for communication with the machine control 10 for the injection molding machine 40. The network 20 is configured as LAN, especially Ethernet.

The machine control 10 also includes an interface 11 which, on one hand, is configured as adapter for the network 20 and, on the other hand, communicates with a serial CAN bus 17 in the machine control 10. In addition to the interface 11, the machine control includes memories 12, 14, a microprocessor 13 as well as interfaces 15, 16, whereby the mentioned components communicate with one another via the serial network 17. The interfaces 15, 16 are connected to sensors 42 and actuators 41, 43, 44 and deliver data or commands to the actuators 41, 43, 44 or receive data or commands from the sensors 42. The sensors 42 are typically temperature sensors, pressure sensors, distance sensors or the like, whereas the actuators 41, 43, 44 are typically motors or hydraulics for rotating the screw, for moving the screw, opening and closing of the mold etc.

Data are inputted by hand in this conventional control system via the keyboard 4 of the operating unit 1 and programs can also be installed. Respective data programs are then delivered via the LAN network 20 to the machine control 10 and stored there or further processed for the control. The respective commands are generated for the actuators and forwarded. Conversely, data is received by the operating unit 1 from the sensors for the machine control 10 and the LAN network 20 and visualized there.

The depicted control system is suitable for carrying out a real-time machine control because the machine control 10 directly controls the injection molding machine 40 and uses a rapidly working serial network 17. In contrast thereto, the operation of the machine control 10 via the operating unit 1 and the LAN network 20 is not implemented in real time. This network is however compatible with, e.g., the internet protocol, and further computers, e.g., a PC 30, can easily be connected to this network for visualization, documentation or the like.

Typically, the connection, for example between the keyboard 4 and the display device 3, of this conventional control system is rigid, whereby the keyboard 4 and the display device 3 use the same processor.

It would be desirable and advantageous to provide an improved injection molding machine which exhibits a greatest possible range of variation with regard to implementation.

SUMMARY OF THE INVENTION

According to one aspect of the present invention, an injection molding machine includes a plurality of input and output units, a plurality of actuators, a plurality of sensors, and at least one computing unit, wherein a functional assignment of the input and output units, actuators and sensors is established via the computing unit and changeable online.

The present invention resolves prior art problems by eliminating the provision of unchangeably rigid data paths between the input and output units, sensors and actuators as well as one or more computing units. As a consequence, further input components such as keyboards, functional keys, operating knobs etc. can be added or configured for assuming other functions. The same is true for the output units such as monitors, display devices, LEDs (light emitting diodes), printer etc.

According to another feature of the present invention, the computing unit of the injection molding machine and the input and output units or operating unit can be provided with a gigalink interface and communicate with one another via a gigalink connection. The gigalink connection has a high data throughput, and data can be reliable transmitted over a great distance.

According to another feature of the present invention, one or more computing units, one or more operating keyboards and interfaces for sensors and actuators can be connected via a serial bus system. In this way, several systems, e.g. computing units, operating keyboards etc. can be provided side-by-side at same priority so as to attain a high degree of flexibility, and the system can be easily expanded by additional units for visualization or input and output of information.

According to another feature of the present invention, there may be provided at least one display unit which is connected via a computing unit with the serial bus system. It is, of course, possible to provide several such display and computing units. As an alternative, the display unit may also be connected via a suitable interface with the serial bus system.

According to another feature of the present invention, one or more keys of the keyboard or the keyboards may be configured as parametrizable keys. In other words, these keys can be configured to assume particular functions, either during implementation of the system or through programming by an operator.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2a is a block diagram of a first embodiment of a control system for an injection molding machine in accordance with the present invention;

FIG. 2b is a block diagram of a second embodiment of a control system for an injection molding machine in accordance with the present invention; and FIG. 2c is a block diagram of a third embodiment of a control system for an injection molding machine in accordance with the present invention.

DETAILED DESCRIPTION OF PREFERRED EMBODIMENTS

Figure 1:
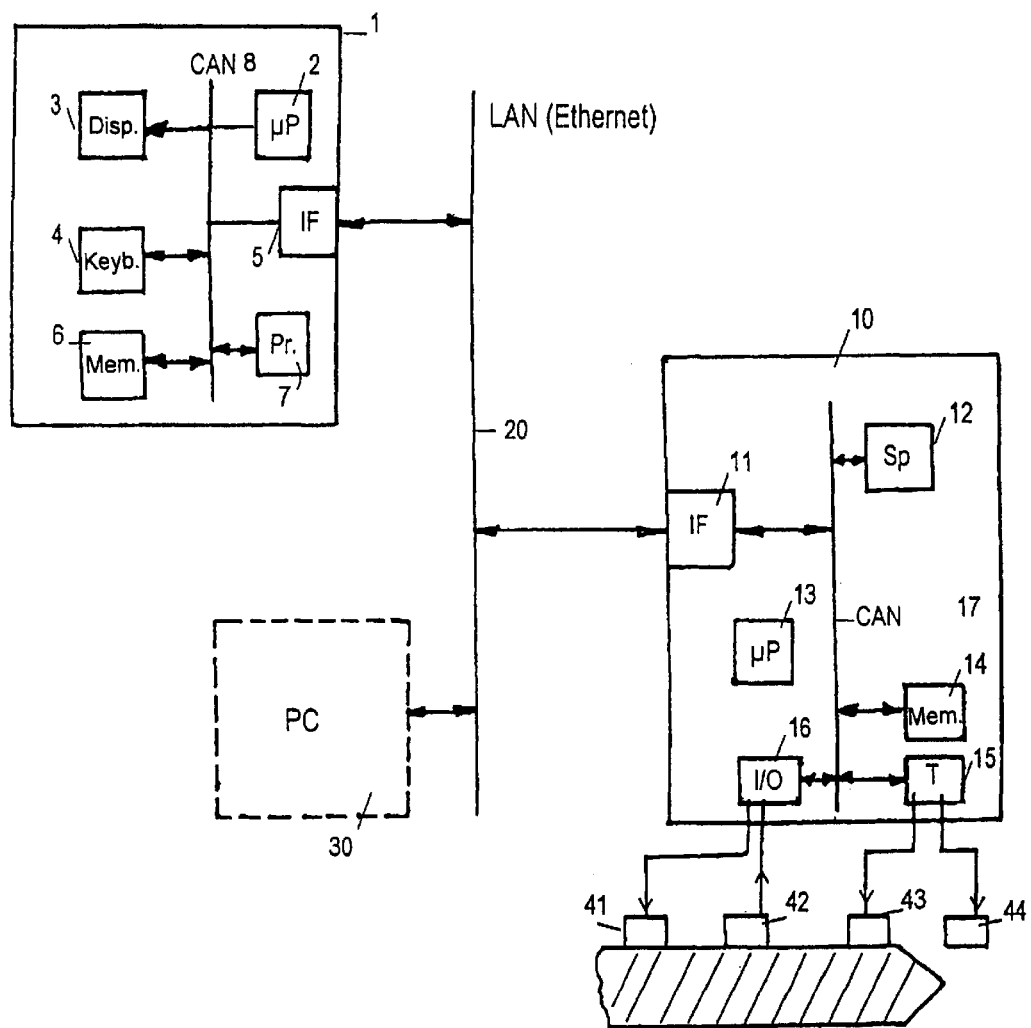
FIG. 1 is a block diagram of a conventional control system for an injection molding machine.

Throughout all the Figures, same or corresponding elements are generally indicated by same reference numerals. These depicted embodiments are to be understood as illustrative of the invention and not as limiting in any way.

Turning now to the drawing, and in particular to FIG. 2a, there is shown a block diagram of a first embodiment of a control system for an injection molding machine 40 in accordance with the present invention. Parts corresponding with those in FIG. 1 are denoted by identical reference numerals. The injection molding machine 40 is provided with actuators and sensors 41, 42, 43 which are connected via interfaces 15, 16, 17 to an input and output (I/O) unit for data. The interfaces 15, 16, 17 are connected with a serial bus system 90 (DIAS, serial multi-point bus). Connected to the bus system 90 is also a computing unit 61 with a display unit 62, two keyboards 63, 64 and a computing unit 65 with a display unit 66. These components communicate via the serial bus system 90 with one another. In this depicted configuration, at least one of the computing units 61, 65 is provided to assume the machine control for controlling the process sequence.

As an alternative thereto, it is also possible to place a machine control 50, as indicated by broken line in FIG. 2a, between the bus system 90 and the interfaces 15, 16, 17. In this implementation, the computers 61, 65 serve essentially for entry of commands and data as well as for data output and visualization.

As schematically illustrated in FIG. 2a, the keyboards 63, 64 are provided with separate display units 67, 68 which may be configured as LED elements and provide a display of selected signals, e.g., machine mode, key entry etc.

Turning now to FIG. 2b, there is shown a block diagram of a second embodiment of a control system for an injection molding machine in accordance with the present invention. Parts corresponding with those in FIG. 2a are denoted by identical reference numerals and not explained again. This embodiment corresponds substantially to the embodiment of FIG. 2a, with the difference between the embodiments residing in the connection of the display units 71, 72 directly to the serial bus 90.

Turning now to FIG. 2c, there is shown a block diagram of a third embodiment of a control system for an injection molding machine in accordance with the present invention. Parts corresponding with those in FIG. 2a are denoted by identical reference numerals and not explained again. In this embodiment, provision is made for a separate operating unit 80 which may include, e.g., a display, a keyboard and LED elements. Besides these components, there is also provided a gigalink interface 81 for connection to a gigalink bus 84. In addition to a data input/output and capacities required for the connection, the operating unit 80 does not require any further "intelligence".

The operating unit 80 is connected via the gigalink bus system 84 with a CPU (central processing unit) 82 which includes a gigalink interface 83. The CPU 82 is connected with the serial bus system 90 and may serve as machine control for assuming the entire process control. Of course, it is also possible here to provide a separate machine control 50, whereby the CPU 82 establishes a connection between the serial bus system 90 ad the gigalink bus system 84.

The embodiments, as shown in FIGS. 2a, 2b, 2c, may be used alternatively or in combination. Hereby, the functions of the machine control may be assigned to individual computers, e.g., components 61, 82 or 50; However, these functions may also be distributed to different computers. In particular when time-critical parameters are involved, the use of a machine control 50, which is arranged physically in proximity of the actuators and sensors 15–17, may be provided.

Suitably, the afore-described control systems are so configured that the functional assignment of the individual components are set adjustably. Hereby, it is possible, for example, to store the connections of the individual input and output units amongst one another and to one or more computing units and sensors and actuators in a storage, such as a hard disk of a PC, a RAM (random-access memory), magnetic data storage etc. In this way, it is determined which keyboard entry appears on which monitor, which computing unit is addressed by which keyboard, etc. Also, particular operating elements can be linked directly with particular processors to enable a direct intervention into the process sequence.

As a consequence of accessing the assignment memory, random linkages can be altered, added or removed, whereby this access can be realized in principle also externally via a data network.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An injection molding machine, comprising:
   a plurality of input and output units;
   a plurality of actuators;
   a plurality of sensors;
   at least one computing unit; and
   a serial bus system, wherein the computing unit, each of the sensors, actuators and input units have an interface for the serial bus system and communicate with one another via the bus system, wherein a functional assignment of the input and output units, actuators and sensors is established via the computing unit and changeable online.

2. The injection molding machine of claim 1, and further comprising a plurality of said computing unit, wherein data flow paths between the computing units and their functional assignment is changeable online.

3. The injection molding machine of claim 1, and further comprising a plurality of gigalink interfaces placed between the computing unit and each of the input and output units and communicating via a gigalink connection.

4. The injection molding machine of claim 1, and further comprising at least one display unit which is operated by the at least one computing unit.

5. The injection molding machine of claim 1, and further comprising at least one display unit which includes an interface for the serial bus system.

6. The injection molding machine of claim 1, wherein the input units are constructed as keyboards with display elements.

7. The injection molding machine of claim 1, wherein the input units include parametrizable operating elements.

* * * * *